UNITED STATES PATENT OFFICE.

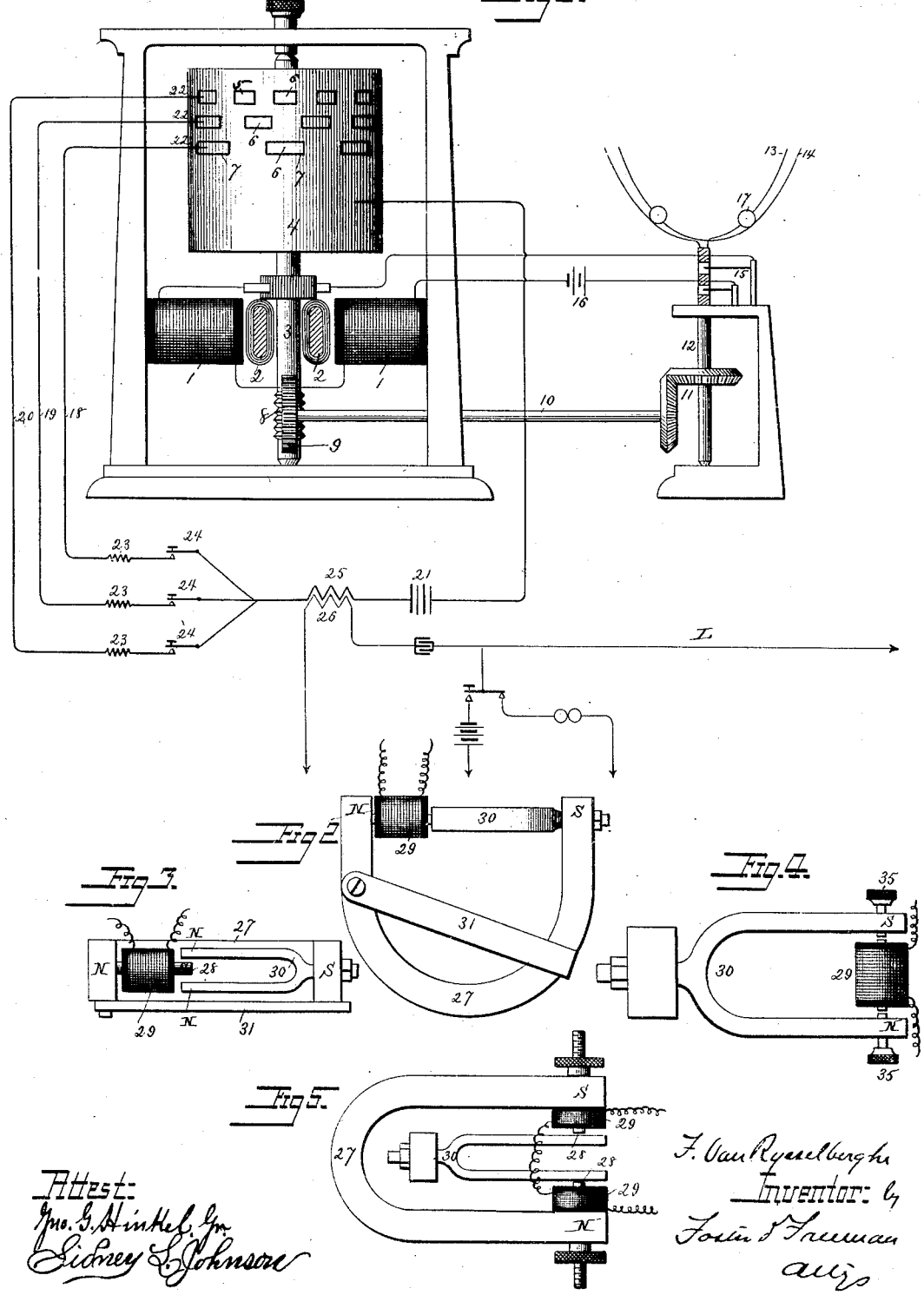

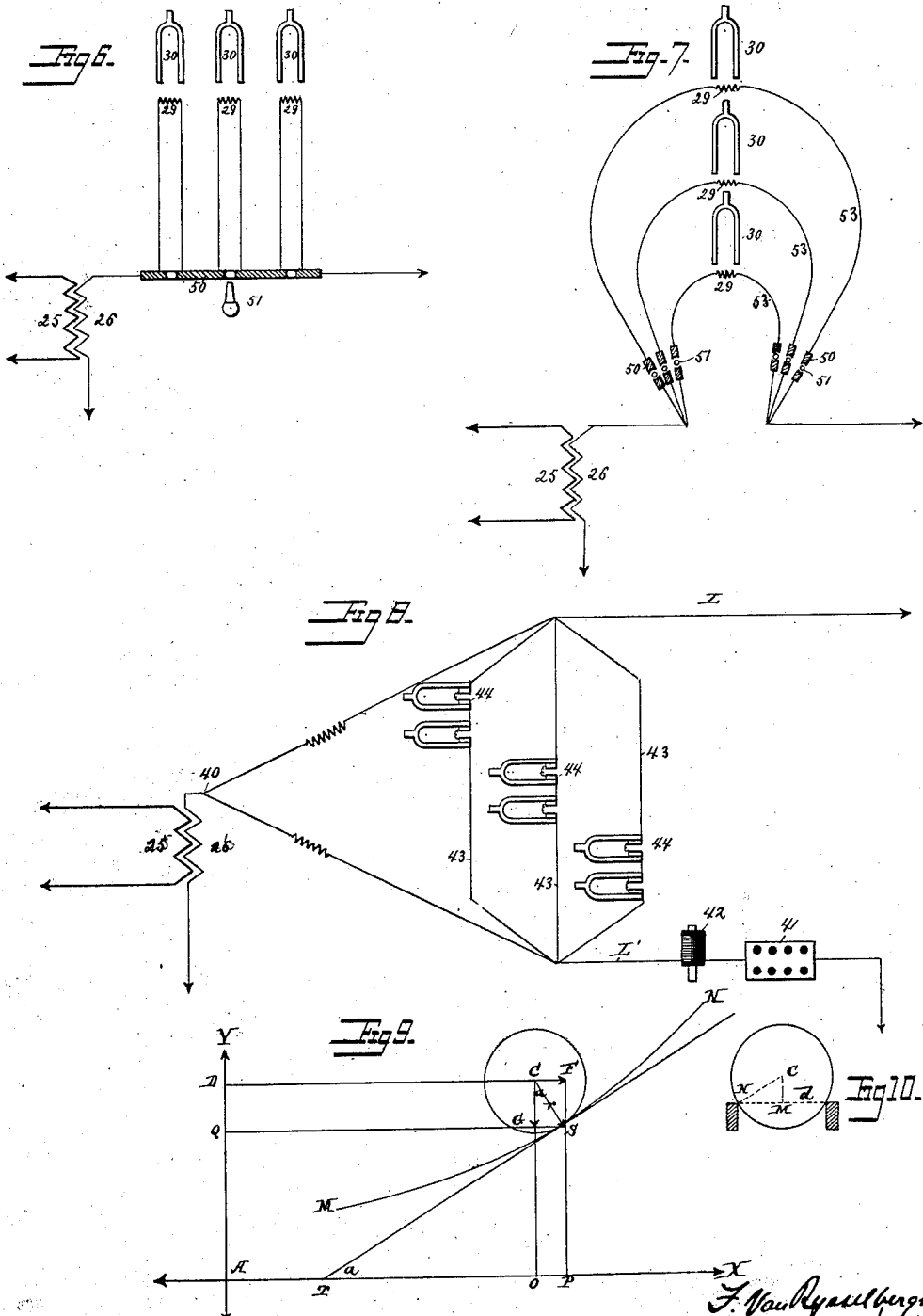

FRANÇOIS VAN RYSSELBERGHE, OF BRUSSELS, BELGIUM.

PHONO-MULTIPLE TELEGRAPHY.

SPECIFICATION forming part of Letters Patent No. 370,577, dated September 27, 1887.

Application filed May 4, 1887. Serial No. 237,123. (No model.)

*To all whom it may concern:*

Be it known that I, FRANÇOIS VAN RYSSELBERGHE, a citizen of Belgium, residing at Brussels, Belgium, have invented certain new and useful Improvements in Phono-Multiplex Telegraphy, of which the following is a specification.

My invention relates to harmonic or phono-multiplex telegraphy; and it has for its object to produce a simple and effective telegraph system that is capable of being used to transmit a large number of messages simultaneously upon a single line over great distances.

I am aware that heretofore many efforts have been made to produce such a telegraph system. Perhaps the most prominent phonic system heretofore tried was one in which a series of tuned reeds were used to produce the vibrations or variations of potential on the line, and a similar form of similarly-tuned reeds were used as receivers, and this has met with a certain amount of success in that a limited number of messages have been successfully transmitted over a line of limited length by the use of a very large source of electric energy. I have made an extended research, both scientific and practical, upon this subject to find out not only the cause of the prior failures in this class of telegraphy, but to find methods and means whereby the known as well as the unknown difficulties may be overcome in a practical manner, and I have produced a system of multiplex phonic telegraphy which has proved to be a practical and commercial success, in that a very large number of separate messages may be simultaneously transmitted in the same or opposite directions over a single line and to great distance by the use of a very small source of electric energy, and I will now proceed to describe the principles of my present invention and illustrate the same by one form of phonic telegraph in which it has been successfully embodied.

It is well known that in this class of telegraphs the transmitters are suitably constructed and arranged to throw or superpose upon the main line independent series of impulses or variations of potential varying in number or rate for each transmitter, and the receivers are intended to be of such construction and to be so arranged that each will respond only to the desired signals sent by the transmitter to which the particular receiver is intended to respond and to be unaffected by all the other signals transmitted by other transmitters; and the object is to send and receive as many series of signals in this manner over a single-line wire in the same or opposite directions as possible and with a small expenditure of battery-power.

One of the first essential principles required for a successful phono-multiplex system of telegraphy is that each transmitting device shall create or produce in the line-circuit simplex-electrical waves, or what I call "simplex electrical tones," which shall correspond exactly with the fundamental tone of the receiving device to be used in connection with the transmitter; or, in other words, it is certainly desirable, if not essential, that the simplex electrical tones produced by the transmitter should, not be accompanied by overtones or harmonics of the same or other secondary tones. In the devices heretofore used for transmitting, where the contact making and breaking or circuit-controlling devices have been in the form of reeds, tuning-forks, a spring bearing upon a revolving cog-wheel, and the like, this has not been the case, as the shock of the reed or fork or spring against the contact-making devices creates overtones as well as tones arising from the shaking of the contact-piece on account of the shock. Further, it is desirable to avoid the prejudicial effects due to sparks from the so-called "extra" current at the breaking of the contact, which not only is destructive to the machine, but also interferes with the simplex tones being produced by the transmitter. Next, it is desirable that the impulses or variations of potential should always be produced in the various transmitters at a rate bearing a certain fixed relation to the rates of all the others, regardless of the speed of the transmitting device, as by this means I avoid the necessity of separately adjusting each transmitter to produce its normal rate, and am not therefore liable to disturb the balance between it and the others and their respective receivers. In order to accomplish these results I have found one of the best means is a cylinder of some proper material, nickel being preferred, as it is hard, non-oxidizing, and fusible only at high temperatures, and this cylinder is properly mounted and rotated, in a manner hereinafter described, at a very regular rate of speed—say ten revolutions a second, for example. Now suppose, for instance, I want three transmitters, sending, respectively, one hundred and eighty, two hundred, and two hundred and twenty electric impulses a second to line, I make three series of insulated spaces or openings in each series in a circle around the cylinder, the insulating spaces or holes being equal in length to the metallic conducting spaces or intervals between them, and I place in one row—say the upper series—eighteen insulating spaces or holes, in the next twenty holes, and in the third twenty-two holes. There are various ways in which these insulating spaces or openings may be formed, many of which are obvious, though it is one of the essentials that the holes be filled with some material in order to prevent the harmonics and other sounds caused by the brush or contact-piece striking the edges, and I have found it very desirable to fill the holes with the same material as the cylinder itself; and I therefore fix in the holes plates or blocks of nickel by means of an insulating-cement. I thus provide a cylinder with a substantially uniform surface over which the brushes or contact-pieces can travel without jar or friction and in which the wear of the surface is equal in all parts, and by making each insulating space or block separate from the body of the cylinder, if, by chance, the insulation between any one block and the rest of the cylinder becomes destroyed or defective, that space only will be affected by it and not the rest of the spaces of the same series or of the other series, and it will not interfere with the proper transmission of the impulses. I arrange metallic brushes so that each will pass over its proper series of filled metallic insulating-spaces and conducting-spaces between the latter, so as to alternately open and close the circuit of a battery, of which one pole is connected to the brush and the other with the mass of the revolving cylinder, and is thus arranged to send the impulses to line in a manner hereinafter described. By this arrangement I am enabled to throw upon the line different series of pure simplex tones unaccompanied by overtones or other disturbances, and as all the circuit making and breaking devices bear a fixed relation to each other and rotate at the same speed the rate or number of impulses sent by each of the transmitters will bear the same proportional relations to each other, no matter what the rate of rotation of the cylinder may be, and all adjustment of the transmitters to produce such proportionate rates is avoided. Furthermore, the brushes constantly bear upon a metal surface, the space occupied by the insulating material being very small between the conducting-cylinder and the insulated metal spaces, the wear of the edges of the contacts is reduced to a minimum, and the sparks are small and may be further provided for by a spark-condenser or induction-shunt, as is common.

Perhaps the most essential principle of all is that the rotating cylinder or other circuit-controller shall have an absolutely perfect isochronic motion, not only so that the transmitters at any given station may always send the impulses to line at a given rate of speed, but so that all the transmitting devices at all the stations in the system may be arranged to be rotated in absolute synchronism and all the receivers which are adapted to respond to any given rate may be able to respond to any one of the transmitters at any and all stations transmitting tones having that rate. This principle has heretofore been recognized by persons engaged in experimenting upon phonic systems, and many attempts have been made to overcome the difficulty, and most of these attempts have been in the way of correcting the evil instead of preventing it—that is to say, instead of producing absolutely synchronous movements they have produced only partially-synchronous movements and applied devices for correcting these movements, so that the instruments were in absolute unison only at the instant the correction was accomplished, if at all.

It is hardly necessary to state that the nearer we succeed in producing an isochronic motion the more effective will be succeeding electrical impulses in acting upon the receiver-instrument, especially if it be a tuning-fork, to put it into vibration by their accumulated energy, as each impulse must act at the proper moment, and no one will in any way counteract upon the motion imparted by the previous ones. Further, it is apparent that under these conditions the larger will be the number of messages that can be sent simultaneously over the same wire without interference, as the margin of variation in the vibration of the forks is much smaller.

I have found it advisable to mount the cylinder upon a nicely-balanced vertical shaft running in polished or jeweled bearings, and to drive the shaft by some constant power, preferably a dynamo-electric motor operated by a battery or other source of electric energy of very low internal resistance, as a secondary cell. The circuit of this battery and motor includes a variable resistance, the amount of which is preferably controlled by a proper governor, as will be described hereinafter, in such a way that the resistance is controlled in a gradual and uninterrupted manner without ever making or breaking contact either in the resistance or at the commutator of the motor, for any such making and breaking would cause in the driving-current sudden or abrupt variations, and therefore variations in the speed of the revolving cylinder, which variations, though small, will nevertheless be prejudicial. In order to control this resistance, so as to obtain absolute synchronous movement in the motor, I have found it desirable to have the governor or moving mass controlling the resistance quite independent of internal mechanical resistance, as friction and the like, and that it should be entirely at liberty to move under the sole respective influences of gravity and centrifugal force; and for a given angular speed the conditions of its equilibrium must be exactly the same at every point of its path or in every part of the resistance. As far as I have observed, these requirements cannot be dispensed with and an absolutely-correct governor be produced. In order to realize such a governor, we may imagine a metallic ball or balls resting upon two parallel and revolving curved rails, of low-conductive and non-oxidizable material, preferably driven by the same motor as the transmitting-cylinder, the circuit of the dynamo-motor and the driving-battery including that length of the rails located between the summit of the curved rails and the ball or balls or other form of masses—as double cones, &c.—resting upon them and connecting the one rail with the other, and so closing the circuits. With such an arrangement the problem to be solved is to determine the exact curvature of the rails according to the requirement that for a given constant speed of the motor—say, for instance, one revolution a second—the ball or balls will be in equilibrium at any and all points or places in the path. If the balls were material points or we had masses without size, that ideal curvature would be that of a true parabolic curve, as is well known; but as the balls must have size, the influence of the radius of the spheric balls must be considered, and the only way to get the required path is by mathematical calculation, and I will now indicate that calculation by referring to the diagram, Figure 9.

Let M N represent the curve, to be constructed in such a form that a sphere with radius $r$ rolling upon it will be at equilibrium in every point of the path when the latter turns around its axis A Y at an angular speed, $w$; and let S be any point of the path or curve, and P S or $y$ and P A or $x$ the rectangular coordinates of the point S, and S T the tangential line at the point S; also, $c$ the center of the sphere, $m$ its mass, $g$ the intensity of gravity, and $\pi$ the ratio between diameter and circumference. Finally, let $a$ be the angle between the tangent S T and the axis A $x$. Now, whenever the ball is in equilibrium on the curve, the resultant both of gravity and centrifugal force is normal—I mean perpendicular to the curve. Therefore, if we represent that resultant by the length of C S or by $r$, the centrifugal force will be represented by C F and the gravity by C G. Therefore, $$\frac{\text{centrifugal force or } \frac{4\pi^2 w^2 \overline{DC}^2}{g}}{\text{gravity or } mg} = \frac{CF}{CG} = tg^a = \frac{dy}{dx}$$

or $$\frac{4\pi^2 w^2 \overline{DC}^2}{mg^2} = \frac{dy}{dx}$$

But $$DC = x - CF; \text{ and } CF \sqrt[\text{?}]{\pi^2 - \overline{CG}^2} = \sqrt{r^2 - m^2g^2}$$

or $$DC = x - \sqrt{r^2 - m^2g^2}$$

Which give us finally $$\frac{4\pi^2 w^2}{mg^2}(x^2 - 2x\sqrt{r^2 - m^2g^2} + r^2 - m^2g^2) = \frac{dy}{dx}$$

which is the differential equation of the curve, out of which any one skilled in the art will be able to draw and to construct the path required.

If, instead of rolling on the curve at the whole distance of its radius, as shown in Fig. 9, the governing-sphere were rolling between two parallel rails (see Fig. 10) separated one from the other by a distance, $d$, the required isochronic rails would be the same as above, only replacing $r$ by $\frac{d}{2}$.

Another important principle relating to phono-multiplex telegraphy is found in the arrangement of the battery or other source of energy and circuits in connection with the main-line circuit-controllers, local circuits, &c. When, for instance, two transmitters are each sending, simultaneously, electric impulses to line, the strength of the current or the amount of electric potential variation has to have twice the value as when one transmitter only is operating to send signals. I have found that it is much more desirable to send induced or high-tension currents to the main line than battery-currents, as in the manner used by Varly in his harmonic system, as they can be made to retain their characteristics a greater time and over greater lengths of wire without interference; but in using several transmitters, if we had to put an induction-coil for each transmitter in the line, the current from one of the transmitters would have to traverse the secondary circuits of all the inductoriums, both at the transmitting and receiving end of the line, and as an induction-coil, on account of its self or magnetic induction, is a serious obstacle to the rapid undulatory currents, the latter being graduated thereby, they would greatly reduce the strength of the currents on the line, and consequently the distance to which a great number of simultaneous messages could be sent through one wire. Therefore at each end of the line I use but one induction-coil only, and I preferably use but one battery, though I may use a distinct battery for each transmitter.

Another essential feature is to use a generator of very low internal resistance, as one thousandth of an ohm. The primary circuit of the induction-coil should also be of low resistance, as one-hundredth of an ohm; but to get the best results I put a somewhat noticeable resistance, as one-half of an ohm or so, in each derived branch of the transmitter-circuit. These derived branches should include the isochronic revolving cylinder, the brush bearing upon the cylinder, the key, and the resistance above specified, and all the derived branches close the circuit through the battery and the common primary of the induction-coil.

With a system constructed to embody the above principles the question arises how many simultaneous messages may be transmitted in one or both directions over a single-line wire without interference; and I find there are certain principles governing this which I will now endeavor to explain. A tuning-fork, tuned, for instance, at the rate of three hundred and sixty vibrations a second, will respond not only to impulses of that rate, but also of any rate which is about an exact divider of the former—that is to say, that such fork, the fundamental tone of which is three hundred and sixty, will also respond to one hundred and eighty, ninety, sixty, or forty-five vibrations, and so on. Of course a transmitter giving forty-five impulses only will not act as efficiently thereupon as another transmitter giving three hundred and sixty pulsations; but still the influence is large enough to create false signals, or to break up the signals when working long distances. My experience is that a tuning-fork tuned at a number of $n$ vibrations is influenced a prejudicial amount by a transmitter giving only $\frac{n}{5}$ impulses a second. Therefore we are compelled to confine ourselves to notes included within one octave only, at least the tone of one receiver of a set being, for instance, $do'$, we cannot on the same line have a receiver the tone of which would be $do^2$ or $do^3$. We can use $re^2$ or $re^3$, if for some reason we prefer to take a higher tone than $re'$; but I found it best to select tones in the same octave and to choose low tones, as low electrical tones are able to go over and produce better effects on longer distances of wire, especially of iron wires, than high tones, on account of self-induction, and as the margin for low-tuned forks is smaller than the margin for tones belonging to the medium of the musical scale I can send a greater number of messages over the same wire. This of course requires a greater regularity in the motion of the revolving cylinder; but therein precisely lies the advantage of my perfect isochronic governor above described, and it is one of the reasons why I succeeded in producing a practical system.

In order to produce suitable receivers for the simplex tones produced by my isochronic transmitters, I have found that the principle involved is that of the pendulum to which a great number of successive impules imparted thereto, even if each of the impulses is very weak, will, after a while, produce an ample vibrating motion, through the accumulation of energy, if each impulse is given at the proper time and if its effect is not wasted outside the pendulum—for instance, by friction, motion imparted to its support, or by molecular counteracting effects. In the absence of such disturbing conditions each impulse will add its effects to the accumulated effects of the preceding impulses, and the pendulum, reed, or tuning-fork (for the tuning-fork is but a kind of pendulum) will be put into easily perceptible motion by the series of impulses, each of which would be incapable of displacing the mass or bending it to any perceptible amount.

I have found that tuning-forks are much more suitable than vibrating reeds, for when a reed is used a great amount of energy is wasted in putting its support into motion, and such wasting does not occur, or only in a much smaller amount, when properly-balanced tuning-forks are used. In using such tuning-forks as receivers I have found another requirement is essential. For instance, supposing we want to produce by sound or othewise the following Morse signal, — ——. In order to produce the dot or the dash the tuning-fork must be put into perceptible motion, and this motion has to be stopped instantly as soon as each signal is over in order to have "clear-cut" signals. These are apparently contradictory requirements, for when once a tuning-fork is put into vibration its property or tendency is to go on vibrating for a considerable while after the imparting pulsating efforts have ceased. I have found, however, that this difficulty can be successfully overcome by making use of permanently-magnetized tuning-forks or equivalents thereof. In other words, by creating between the fork or the branches of the fork and the coil or coils acting thereupon a permanent magnetic field, the variations of which field, through the variations of potential created in the line-wire by the proper transmitter, will put the fork into vibration as long as such variations in the field are created, but will stop almost instantly the vibrations when the periodically-varying current ceases. Not only will the tuning-fork stop, but I have found it will respond much better to the currents if there is a pre-existing magnetic field between it and the coils than when there is no permanent magnetism there, and this is an aid in reaching larger distances and having more simultaneous messages.

Having now fully described the principles which govern my improved system of phono-multiplex telegraphy, I will illustrate one form of its practical embodiment by referring to the accompanying drawings, forming part of this specification, in which—

Fig. 1 is a diagrammatic view of a transmitting apparatus. Figs. 2, 3, 4, and 5 are views illustrating various embodiments of receiving devices; and in Figs. 6, 7, and 8 I have shown diagrams of various arrangements of the receivers, and diagrams 9 and 10 illustrate the manner of constructing the parabolic governor.

Upon suitable supports is mounted a dynamo-electric motor, 1 2, the armature-shaft 3 of which is extended upward and carries the metal cylinder 4, which is provided with the desired number of series of openings 5, filled with metallic pieces 6, separated from the body of the cylinder by insulating material 7, and the other end of the shaft 3 is provided with suitable connections, shown as a worm-screw, 8, and pinion 9, connected by shaft 10 and bevel cog-wheels 11 to the rotating shaft 12 of the parabolic governor. This governor is provided with rails 13 14, of low-conducting material, connected by means of the brushes 15 with the circuit of the generator 16, which includes the field 1 and armature 2 of the dynamo-motor, and the balls 17 are adapted to move upon the rails and to include more or less of them in circuit according to the variations in the mechanical resistance to the rotation of the governor, and this construction and arrangement of the rails are such, as heretofore indicated, that the centers of the balls are free to move in a parabolic path, governed only by gravity and centrifugal force, and to thus maintain the rotation of the motor isochronous without any adjustment.

The different series of insulated spaces 6 in the conducting-cylinder 4 are arranged so as to produce each a given number of makes and breaks at each rotation of the cylinder in the derived circuits 18 19 20 of the local generator 21, one pole of which is connected directly to the body of the cylinder, and the other by the various brushes 22, arranged to bear upon the series of circuit-controllers in the cylinder. In each of the derived circuits is placed a small resistance, 23, and a key, 24, and they are all joined in the primary circuit 25 of the induction-coil. As before stated, the internal resistance of the generator and the primary is very small, and by means of the resistance 23 I am enabled to distribute the current in proper relations, whether one or more of the keys are simultaneously closed. The main line L includes the secondary 26 of the common primary coil 25, and this line may be supplied with any of the ordinary systems of telegraphic apparatus for sending galvanic currents to line, as is indicated.

In Figs. 2 and 3 I have shown, respectively, a side and plan view of one form of magnetized tuning-fork receivers in which 27 is a permanent magnet having a core-extension, 28, at one pole, surrounded by a line-wire helix, 29, and a tuning-fork, 30, is secured to the other pole, being so arranged that the core-extension is between the branches of the fork, as shown. A magnetic shunt or armature-piece, 31, is adjustably secured upon one arm of the permanent magnet, and serves to regulate the force of the magnetic field between the fork and core, and enables me to accurately adjust the tone of the fork.

In Fig. 4 I have shown a tuning-fork, 30, which is itself a permanent magnet, secured to a suitable support, and the main-line coil 29 is arranged between the branches of the fork, and screws 35 serve to regulate the magnetic field. In Fig. 5 the fork 30 is surrounded by a permanent magnet, 27, having two helices, 29, one on each pole, and the branches of the fork are arranged in the magnetic field between the adjustable core-extensions 28. These forms serve to illustrate the principles of my receiver, heretofore set forth.

I would here remark that the devices for adjusting the magnetic field are not necessary, if the forks are accurately made; but as I have found difficulties in always securing the exact adjustment in constructing the receivers, I can use the adjusting devices for correcting these errors; but when once adjusted they can remain so without movement by the operator.

In Fig. 6 I have shown the receivers as connected in the main line in series, and suitable connections, 50, are provided, by which plugs 51 may be used to short-circuit any one of the receivers, if for any reason it is desired to do so.

In Fig. 7 I have indicated the receivers connected in multiple branches 53 of the main line with plug-connections 50, by which any one may be cut out.

In the diagram, Fig. 8, the primary coil 25 is the only part of the transmitting apparatus shown. The main line L, including the secondary 26, is branched at the point 40, one branch forming the artificial line L', including a rheostat, 41, and magnetic induction-balance 42, and the other branch being connected to the main line L, while the bridge-circuits 43 include the magnetized receiving-instruments 44, suitable resistances being arranged in the branches in a manner well understood. It is evident that the receiving-instruments may be differentialized or arranged in any other well-known way to enable the line to be used for the simultaneous transmission of messages in opposite directions.

It will be evident from the above description that my invention is not limited to the precise construction or arrangement of devices shown, as those skilled in the art may embody the principles set forth in other forms and arrangements without departing from the broad features of my invention.

I claim—

1. The within-described method of phono-multiplex telegraphy, which consists in superposing upon the line series of isochronic simplex electric waves, and translating such waves into audible signals, substantially as described.

2. The method of phono-multiplex telegraphy, which consists in producing series of isochronic simplex electric waves of low potential and transferring such electric waves into waves of high potential, and then translating such high-potential waves into audible signals, substantially as described.

3. The within-described method of phono-multiplex telegraphy, which consists in producing series of isochronic simplex electric waves of low potential, controlling the rate of their production by the combined forces of gravity and centrifugal force, transferring said waves into waves of high potential, and translating them into audible signals by producing variations in a permanent magnetic field, substantially as described.

4. In a phono-multiplex telegraph, a metallic cylinder having circumferential rows of recesses in its periphery, and insulated blocks secured in said recesses flush with the periphery, substantially as described.

5. In a phono-multiplex telegraph, a metallic cylinder having rows of alternate conducting and insulated metal spaces extending around its periphery, substantially as described.

6. In a phono-multiplex telegraph, a metallic cylinder having series of circuit-controlling devices on its periphery, consisting of alternate spaces of conducting and insulated metal, the conducting-spaces in each series being equal to the insulated spaces, substantially as described.

7. In a phono-multiplex telegraph, the combination, with a motor, of a cylinder driven thereby provided with series of circuit-controlling devices, each series bearing a fixed relative proportion to the others, a governor driven by the motor and controlling the electric circuit of the motor, high-resistance conductors included in the circuit and carried by the governor, and regulating devices moving on said conductors under the influence of gravity and centrifugal force only, substantially as described.

8. The combination, with a circuit-controlling cylinder, of a series of derived or branch circuits, each separately controlled by the cylinder, a single primary of an induction-coil for all the branch circuits, and keys in each branch circuit for opening and closing them as desired, substantially as described.

9. The combination, with a circuit-controlling cylinder, of a series of derived or branch circuits, each separately controlled by the cylinder, a single generator of low internal resistance for said circuits, a single primary circuit of an induction-coil of low resistance, and keys for opening and closing said circuits, substantially as described.

10. The combination, with a circuit-controlling cylinder having an isochronic motion, of a series of derived or branch circuits controlled by said cylinder, a single generator of low internal resistance, a single primary of an induction-coil of low resistance for said circuits, a separate resistance in each branch circuit, and keys for opening and closing each circuit, substantially as described.

11. The combination of a generator, the circuit of which includes a motor and an isochronic governor, and another generator, the circuit of which includes circuit-controlling devices driven by the motor, whereby the signals produced by said controlling devices may be isochronic, substantially as described.

12. The combination, with a series of derived local circuits, of a cylinder containing series of circuit-controlling devices constructed to produce relatively proportionate variations in said circuits, a motor operating said cylinder, and a governor including a portion of the resistance of the operating-circuit of the motor devices, moving under the influence of gravity and centrifugal force only and controlling the amount of said resistance, whereby the variations may always be maintained in synchronism, substantially as described.

13. In a phonic or tone telegraph, a receiving-instrument consisting of a tuning-fork and coils connected with the line-circuit, the fork being permanently magnetized, substantially as described.

14. A receiving-instrument for tone-telegraphs, consisting of a permanent magnet, a main-line coil connected to the magnet, and a tuning-fork also connected to the magnet, whereby the fork will vibrate in a magnetic field, substantially as described.

15. A receiving-instrument consisting of a magnet, a line-coil connected to one pole of the magnet, a tuning-fork connected to the other pole of the magnet, and an adjustable shunt for the magnet, substantially as described.

16. A receiving-instrument consisting of a permanent U-shaped magnet, a tuning-fork attached to one pole of the magnet, and a main-line coil attached to the other pole, the core of the latter extending between the branches of the fork, substantially as described.

17. The combination, with a transmitting-instrument sending rapid series of pulsations to line, of an isochronic governor connected to said transmitter, a generator of low resistance, derived circuits of said generator including the transmitter, a single primary of low resistance, a main line including the secondary thereof, and magnetized tuning-fork receivers in said line, substantially as described.

18. The combination, with a transmitter producing isochronic variations in derived circuits, of a low-resistance generator, a single primary therefor, a main line including the secondary, and a series of magnetized tuning-fork receivers connected to the line and switch-connections in the line, whereby any one or all of the receivers may be cut out of the line, substantially as described.

19. The combination, with a transmitting-cylinder having insulated spaces, of a generator of low resistance, derived circuits therefrom, each connected to and controlled by the cylinder, resistances and keys in each derived circuit, a single primary for all the derived circuits, and a main line including the secondary and the receiving instruments in branches of the main line, substantially as described.

In testimony whereof I have signed my name to this specification in the presence of two subscribing witnesses.

FRANÇOIS VAN RYSSELBERGHE.

Witnesses:
F. L. FREEMAN,
WM. A. HARRIES.

It is hereby certified that in Letters Patent No. 370,577, granted September 27, 1887, upon the application of François Van Rysselberghe, of Brussels, Belgium, for an improvement in "Phono-Multiple Telegraphy," errors appear requiring the following corrections to wit: The formula commencing on line 55, page 3, should read:

$$\frac{\text{centrifugal force or } 4\pi^2 w^2 m \overline{DC^2}}{\text{weight} \quad \text{or} \quad mg} = \frac{CF}{CG} = tg\ a = \frac{dy}{dx}$$

But
$$DC = x - CF;\text{ and } CF = \sqrt{r^2 - \overline{CG^2}} = \sqrt{r^2 - m^2 g^2}$$

or
$$DC = x - \sqrt{r^2 - m^2 g^2}$$

which gives us finally
$$\frac{4\pi^2 w^2}{g}(x^2 - 2x\sqrt{r^2 - m^2 g^2} + r^2 - m^2 g^2) = \frac{dy}{dx}$$

instead of as printed; and in lines 77–78, same page, "replacing $r$ by $\frac{d}{2}$," should read, *replacing $r$ by the value of distance CM.;* and that said Letters Patent should be read with these corrections therein that the same may conform to the record of the case in the Patent Office.

Signed, countersigned, and sealed this 4th day of October, A. D. 1887.

[SEAL.]

D. L. HAWKINS,
*Acting Secretary of the Interior.*

Countersigned:
BENTON J. HALL,
*Commissioner of Patents.*